United States Patent
Murphy et al.

(10) Patent No.: US 6,380,712 B2
(45) Date of Patent: Apr. 30, 2002

(54) BATTERY BOOSTER WITH PRECONDITIONING AND TEMPERATURE COMPENSATION

(76) Inventors: Kenneth C. Murphy, 5 Indian Rock La., Hingham, MA (US) 02043; Curtis Quinter, 7320 Crown Rd., Knoxville, TN (US) 37918

( * ) Notice: Subject to any disclaimer, the term of this patent is extended or adjusted under 35 U.S.C. 154(b) by 0 days.

(21) Appl. No.: 09/829,810
(22) Filed: Apr. 10, 2001

Related U.S. Application Data

(60) Provisional application No. 60/195,356, filed on Apr. 10, 2000.

(51) Int. Cl.[7] .................................................. H02J 7/00
(52) U.S. Cl. ........................................ 320/107; 320/104
(58) Field of Search ................................ 320/107, 104, 320/101, 103, 137, 139

(56) References Cited

U.S. PATENT DOCUMENTS 5,359,280 A  * 10/1994  Canter et al. ................ 323/282
5,637,978 A  *  6/1997  Kellett et al. ................ 320/104

* cited by examiner

*Primary Examiner*—Peter S. Wong
*Assistant Examiner*—Lawrence Luk

(57) ABSTRACT

A self-contained emergency battery charger for use in motor vehicles for charging a fully or partially discharged starter storage battery which delivers current to a starter motor of the vehicle. The batter charger contains a preconditioning circuit to preconditions a discharged battery before applying a full charging current from a charged second battery to the discharged battery. The battery charger also contains a temperature circuit which adjusts the time of charging whereby the time for providing power from the second battery is increased or decreased in relation to the second battery's temperature.

4 Claims, 4 Drawing Sheets

BATTERY BOOSTER WITH PRECONDITIONING AND TEMPERATURE COMPENSATION

This Application claims benefit to Provisional Application No. 60/195356 filed Apr. 10, 2000.

BACKGROUND OF THE INVENTION

This invention relates to battery charging devices, and in particular to a self-contained emergency battery charger for use in motor vehicles for charging a fully or partially discharged starter storage battery which delivers current to a starter motor of the vehicle.

A motor vehicle storage battery frequently falls into a state of discharge such that it cannot deliver sufficient current to the starter motor. This is often due to lights or other accessories being accidently left on. Also, defective vehicle charging systems can result in the same problem.

To start a vehicle whose storage battery has been partially or completely discharged requires either by-passing the electrical starting system entirely or supplying the electrical starting system with an additional source of external electrical power. The former technique is generally accomplished by push-starting the vehicle and the latter technique by using either jumper cables connected to a fully charged external power source in another vehicle, termed "jump starting", or a conventional battery charger. Push starting requires assistance in the form of a push vehicle or human muscle power. Additionally, only cars fitted with standard transmissions can be push started. Jump starting requires the aid of an additional vehicle. Further, cables must be available and must be externally connected, requiring the user to exit the vehicle, and be exposed to the hazards of weather or of possible battery explosion and associated mishaps as a result of a misconnection of the cables. The disadvantage of a conventional battery charger is the need to be near a source of external power such as 120 volts alternating current.

To overcome these problems and the limitations of prior art attempts to solve the problem, such as being useful only for one or two battery charges before the secondary battery source must be replaced, a very slow recharge cycle, a need for an external source of power, and insufficient portability or lengthy charging/recharging times, assignee developed a battery booster, subsequently patented as U.S. Pat. No. 5,637,978, issued on Jun. 10, 1997, said patent being incorporated herein by reference and hereinafter referred to as the '978 battery booster.

Through extensive testing of lead acid batteries Applicants have learned that a fully drained automotive (lead acid) battery will not accept current and return it efficiently under certain conditions. Specifically, Applicants have found that when a lead acid battery (originally a nominal 12 volts) is discharged below 5 volts, the charge acceptance is <40%. The original design parameters for the '978 battery booster were to deliver 5 amps constantly from the time the charging switch is activated. During testing, limited success was achieved starting vehicles. The '978 battery booster, as originally designed was successful in starting vehicles whose discharged batteries were $\geq 9.5$ volts. Further research verified that low current return occurred when the lead acid battery was <5 volts. A very high rate of current return (88% to 92%) occurred when the lead acid battery was >10.5 volts.

During their research, Applicants also found a variation in time required to recharge a lead acid battery. Applicants found that, within operating temperature limits, during a given time period, a warm battery will provide more electrical power than cold battery. Therefore, under colder conditions the time required to fully recharge a battery is longer. The original '978 battery booster had a simple resistor/capacitor circuit that took a resistor of fixed value and charged a capacitor of a fixed value giving a fixed time regardless of temperature.

SUMMARY OF THE INVENTION

The present invention "preconditions" a discharged battery before applying a full charging current from a charged second battery to the discharged battery. The invention circuitry first checks the voltage level of the discharged battery. If the voltage level is at or below a first predetermined level, a minimum charging current, which is less than half the value of a full charging current, is applied to the discharged battery from the second battery. The minimum charging current is applied to the discharged battery until the voltage of the discharged battery rises to a second predetermined level. After the voltage of the discharged battery reaches the second predetermined level, the invention applies a full charging current to until the discharged battery is fully charged.

In providing the charge to the discharged battery from the charged second battery, the present invention adjusts the time of charging whereby the time for providing power from the second battery is increased or decreased in relation to the second battery's temperature.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
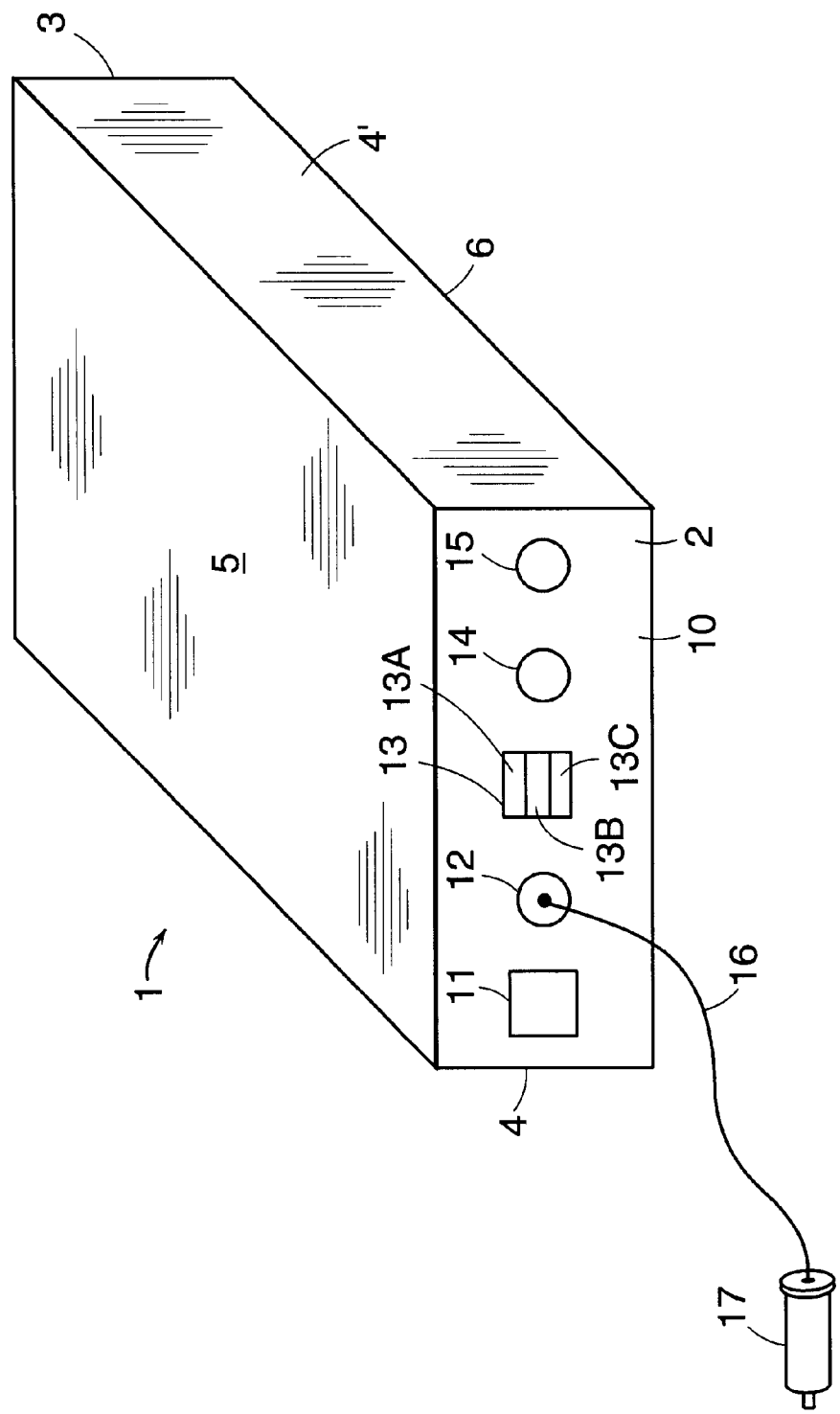
FIG. 1 is a perspective view of the invention.

The present invention is an improvement in providing a charge to a discharged battery from a charged second battery as identified in the '978 patent. Specifically, the present invention adds a preconditioning step to the charging process as well as temperature compensation.

The invention has a generally box-like, rectangularly shaped housing 1, having a front 2, back 3, two sides 4, a top 5 and a bottom 6. The housing front 2 has a panel 10 attached covering the entire housing front 2. Visible horizontally across the panel 10 from the left side 4 to the right side 4' are an auxiliary power tap 11 which allows power to be drawn from the invention power source 30, i.e., charging battery, for non-vehicle battery-charging purposes. Immediately to the right of the tap 11 is an opening 12 through which a power cord 16 passes, said power cord 16 terminating in a male receptacle 17 adapted for insertion into a vehicle's cigarette lighter receptacle 27. The male receptacle 17 has a positive lead 18 terminating centrally along its central longitudinal axis and a cylindrical housing 19 connected to the invention common ground 38. Immediately to the right of said opening 12 is a first switch 13 which is a three-way switch. The switch 13 provides a "Charge" setting 13A, an "Off" setting 13B and a "Recharge" setting 13C. To the right of the switch 13 are two light indicators 14, 15. The light indicator 14 immediately to the right of the switch 13 is yellow and indicates various vehicle storage battery 20 charging modes. The next light indicator 15 is green and indicates various invention charging, recharging and test modes.

Figure 2:
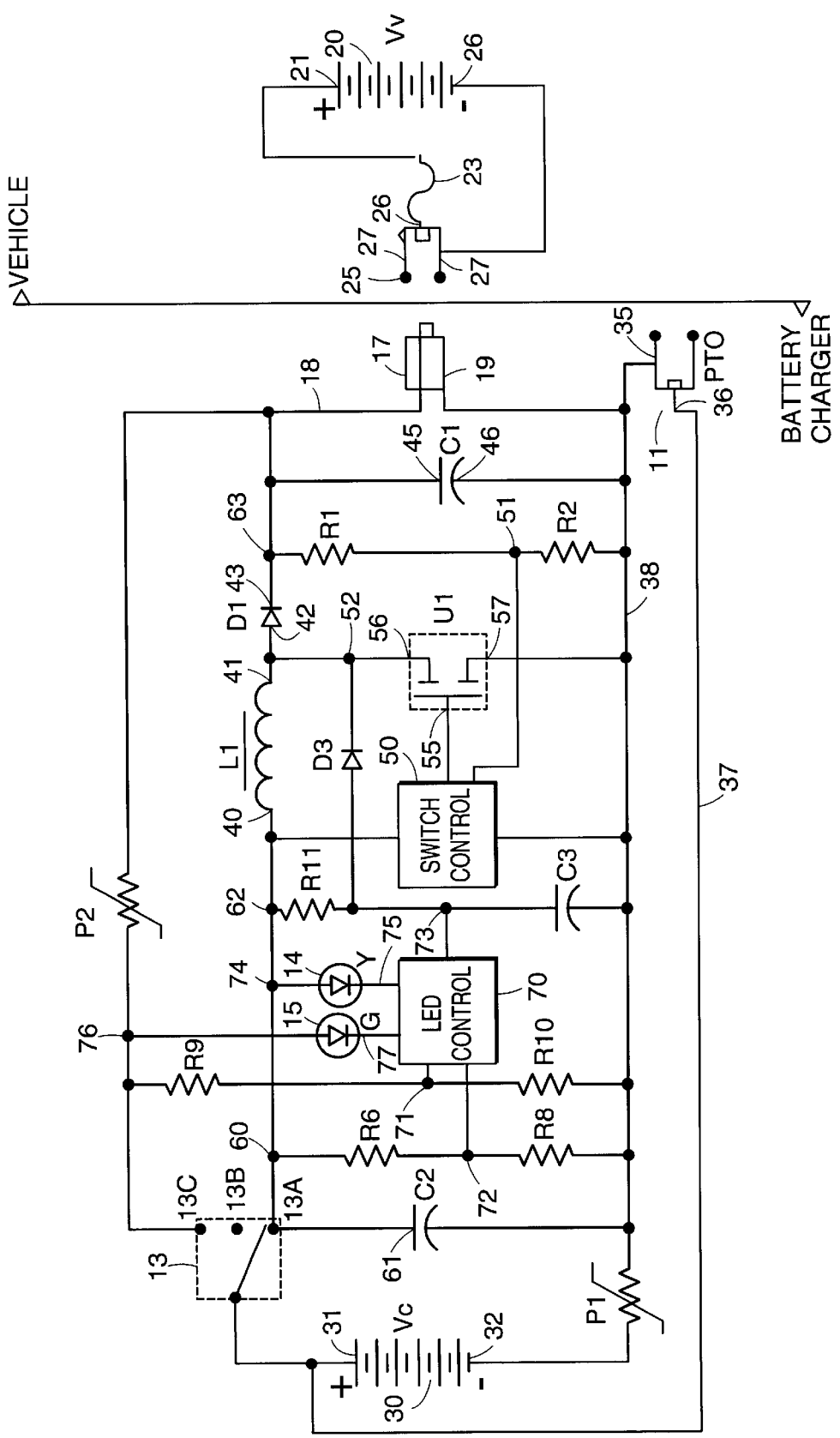
FIG. 2 is a schematic circuit diagram of the prior art.

FIG. 2 illustrates the circuit diagram of the '978 patent. Referring to FIG. 2, there is shown a vehicle storage battery 20. A vehicle storage battery is typically a 12 volt, 40 Ampere-Hour, lead acid battery. A vehicle storage battery 20 and vehicle cigarette lighter 25 electrical circuit is shown. The lighter 25 is formed of a female receptacle 27 terminating centrally along its central longitudinal axis in a positive lead 26. There is a fuse 23 between the positive terminal 21 of the vehicle storage battery 20 and the lighter positive lead 26. The lighter receptacle 27 is electrically connected to the battery negative terminal 26.

The invention has a charging battery 30. The nominal voltage output from the charging battery 30 is represented by the symbol Vc. The charging battery 30 in this embodiment of the invention is a 12 volt, 7 Ampere-Hour, sealed, lead acid battery. This type of battery is rated at 12 volt nominal output. The charging battery 30 has a positive terminal 31 and a negative terminal 32.

An optional auxiliary circuit is formed with the charging battery 30 to the auxiliary power tap 11. The tap 11 is comprised of a female receptacle 35 terminating centrally along its central longitudinal axis in a positive lead 36. The tap positive lead 36 is electrically connected by means of electrical line 37 to the charging battery positive terminal 31. The tap receptacle 35 is electrically connected to a common ground 38 terminating in the charging battery negative terminal 32. This embodiment of the invention contains a positive temperature coefficient resistor, P1, between the charging battery negative terminal 32 and the common ground 38. The resistor, P1, is variable and non-linear. P1 has a low resistance value at relative low temperatures, but has substantially higher resistance at high temperatures. P1 acts as a current limiting fuse. P1 will exhibit low resistance characteristics at less that 6 amps and very high resistance at greater than 6 amps.

Also shown is a depiction of the three-way switch 13 mentioned above. The switch 13 may be termed a first switching means and is adapted to electrically connect the battery positive terminal 31 to one of three nodes 13A, 13B or 13C. The switch 13 provides a "Charge" setting when the battery positive terminal 31 is connected to node 13A; an "Off" setting when connected to node 13B; and a "Recharge" setting when connected to node 13C. The switch 13 is shown in its "Charge" setting 13A. The "Charge" setting establishes a circuit whereby the charging battery 30 and other invention circuitry charge the vehicle storage battery 20 through the cigarette lighter 25. The "Recharge" setting establishes a circuit whereby the invention charging battery 30 is recharged from the vehicle storage battery 20 through the cigarette lighter 25.

The "Charge" circuit established by the switch 13 places a capacitor C2 in parallel to the charging battery 30 wherein the capacitor C2 positive terminal 61 is electrically connected to the switch node 13A. A resistance network comprised of two resistors R6, R8, in series, is also electrically connected in parallel with the capacitor C2. An RC (resistance-capacitance) network comprised of a resistor R11 and capacitor C3, in series, is also electrically connected in parallel with the resistance network R6, R8. An inductance L1 and diode D1 are electrically connected in series with the charging battery positive terminal 31 wherein the inductance L1 input terminal 40 is electrically connected to the capacitor C2 positive terminal 61, the resistance network R6, R8 positive node 60, and the RC network R11, C3 positive node 62. The inductance L1 output terminal 41 is connected to the diode D1 positive terminal 42. The diode D1 negative terminal 43 is connected to the positive lead 18 of the power cord male receptacle 17. A second switch U1, having a primary terminal 55 and two secondary terminals, one 56 of said secondary terminals being positive and the other 57 being negative, said secondary terminals 56, 57 being adapted to jointly connect to said primary terminal 55 or being jointly disconnected from said primary terminal 55, said positive secondary terminal 56 being connected to said inductance L1 output terminal 41 and said negative secondary terminal 57 being connected to said common ground 38, thereby interconnecting the inductance L1 output terminal 41 to ground 38 when the switch U1 is closed. A diode D3 interconnects the positive terminal 52 of the switch U1 with the junction 73 of R11 and C3. A U1 switch control 50 interconnects the inductance L1 input terminal 40 to ground 38. The switch control 50 is electrically connected to the switch U1 and also is connected to a resistance network comprised of two resistors R1, R2, in series. The resistance network R1, R2 interconnects the diode D1 negative terminal 43 to ground 38. The switch control 50 is connected to the junction 51 of R1 and R2. A capacitor C1 is connected in parallel to the resistance network R1, R2 wherein the capacitor C1 positive terminal 45 is electrically connected to the resistance network R1, R2 positive node 63. The diode D1 negative terminal 43, resistance network R1, R2 positive node 63, and capacitor C1 positive terminal 45 are electrically connected to the positive lead 18 of the power cord male receptacle 17.

To charge the vehicle battery the switch 13 is set to "Charge" mode. The power cord male receptacle 17 is inserted into the cigarette lighter 25 thereby establishing an electrical connection among the C1 positive terminal 45, the diode D1 negative terminal 43 and the resistance network R1, R2 positive node 63, and the vehicle battery positive terminal 21, and thereby establishing an electrical connection between the vehicle battery negative terminal 22 and the invention common ground 38. The C1 negative terminal 46 is also attached to the common ground 38. In the "Charge" mode the invention must be capable of stepping up the voltage from the loaded terminal voltage Vc of the charging battery 30 to the terminal voltage required to charge the vehicle storage battery 20, i.e., from approximately 12 volts to approximately 14 volts. In the present invention this is done by means of a "boost converter" which is that portion of the circuit comprised of the elements L1 (inductance), D1 (diode), and U1 (switch). The switch U1 is controlled by a switch control unit 50. The switch control unit 50 is self-oscillating with a switching rate based upon output voltage feedback across the resistance network R1 and R2. The voltage between the inductance L1 positive terminal 40 and ground 38 supplies power to the switch control unit 50 circuitry. In the switch "Charge" setting, an electrical connection is made across terminal 13A thereby electrically connecting an input filter capacitance, C2, from the charging battery positive terminal 31 to the common ground 38. C2 provides a filtering function and a low impedance input to U1. C1 provides a load for the booster converter to discharge into in case the fuse 23 is blown or some other similar situation arises. The Charging setting also connects the charging battery positive terminal 31 in electrical series connection with the input terminal 40 of the inductance L1. In the Charging mode, when the switch U1 closes, the inductance L1 is in series with the charging battery 30. Current in the inductance L1 increases slowly rising to 5 amps. Because of the nature of an inductance, when the switch U1 opens, current will still flow in L1 and the voltage across L1 will adjust to maintain current flow. Since the voltage at the L1 input terminal 40 must equal Vc, there will be a polarity change wherein the voltage at the L1 output terminal 41 will become greater than Vc at the L1 input terminal 40 thereby maintaining current flow in L1. With the power cord male receptacle 17 connected to the cigarette lighter 25, the positive terminal 21 in the vehicle storage battery 20 will feel the greater voltage at the L1 output terminal 41. The effect of this greater voltage will cause the L1 5 amp current to flow into the vehicle storage battery 20. The inductance L1 in effect acts as a current fly wheel. D1 prevents the vehicle storage battery 20 from discharging back into L1. The switch U1 will then close again and the process will repeat.

The "Recharge" circuit established by the switch node 13C interconnects a positive temperature coefficient resistor, P2, with the charging battery positive terminal 31 and the vehicle battery positive terminal 21. By connecting the power cord male receptacle 17 with the vehicle cigarette lighter 25, an electrical connection between the vehicle battery negative terminal 22 and the invention common ground 38 is established. Like P1, the resistor, P2, is variable and non-linear. P2 has a low resistance value at relative low temperatures, but has substantially higher resistance at high temperatures. Initially, the resistance of P2 rises very slowly as temperature rises. After the temperature reaches a designated value, the resistance of P2 rises exponentially. P2 is also current limiting and acts as a self-repairing fuse. Unlike prior art devices, P2 allows the charging battery 30 to recharge without exceeding the safe recharging current, i.e., approximately 2 amps. The Recharge circuit is basic and permits a simple and efficient method of recharging the invention charging battery 30 after use.

The light indicators 14, 15 indicate to the user what is happening and in this embodiment of the invention are light emitting diodes (LEDs). A resistance network comprised of two resistors R9, R10, in series, is electrically connected between the switch node 13C and ground 38. An LED control unit 70 is connected to the junction 71 of R9 and R10. The LED control unit 70 is also connected to the junction 72 of R6 and R8, and also to the junction 73 of R11 and C3. The positive terminal 74 of the yellow LED 14 is electrically connected to the switch node 13A and the positive terminal 76 of the green LED 15 is electrically connected to the switch node 13C. The negative terminal 75 of the yellow LED 14 and the negative terminal 77 of the green LED 15 are both connected to the LED control unit 70. In operation, the green LED 15 lights when the switch 13 is in the "Charge" position at switch node 13A and Vc is below 9.5 volts thereby indicating that no charge is left in the charging battery 30. Power to light the green LED 15 and operate the LED control unit 70 comes from the vehicle storage battery 20. The green LED 15 also lights when the switch 13 is connected to the "Recharge" position 13C and Vc is above 12.5 volts thereby indicating that the charging battery 30 is fully charged. Voltage feedback signals for these two conditions are provided by the resistance networks comprised of R6 and R8, and R9 and R10, respectively. The yellow LED 14 operates as follows. If the voltage across C3 is less than a designated reference voltage, the yellow LED 14 will be turned on. If the voltage across C3 is greater than a designated reference voltage, the yellow LED 14 will be turned off. When switch U1 closes, C3 is discharged via D3. When U1 opens, C3 slowly recharges via R11. If U1 is being switched at high frequency then the average charging voltage on C3 will be low and usually below a reference voltage, resulting in the yellow LED 14 being brightly illuminated thereby indicating that current is being transferred from the charging battery 30 to the vehicle storage battery 20. If vehicle battery 20 is not connected via the cigarette lighter 25 and plug 17, the voltage across C1 will rise and the switch U1 will operate at a low frequency. This results in a greater charging voltage across C3, usually greater than the reference voltage, and consequently an apparently dimmer yellow LED 14 because of the greater amount of time the LED 14 is turned off.

The performance of the invention on a particular vehicle may be calculated as follows. To determine the energy transfer to the "dead" vehicle storage battery 20, multiply the time (in hours) by the charge current (typically 5 Amperes) and factor the "charge-discharge" efficiency of the vehicle storage battery 20 (assume 50%). Since the battery charger will be a "constant current" device, the energy transferred to the vehicle storage battery 20 will be linear with time. On the assumption that it will take about 0.56 Ampere-Hours to start a typical, but cold, functioning vehicle engine (200 Amperes×10 seconds×3600 seconds/hour), it will take about 15 minutes to transfer enough energy to start the vehicle. If the vehicle storage battery 20 is not discharged as much, less charging time will be required. The above performance figures are stated at 32° F. (0° C.).

Figure 3:
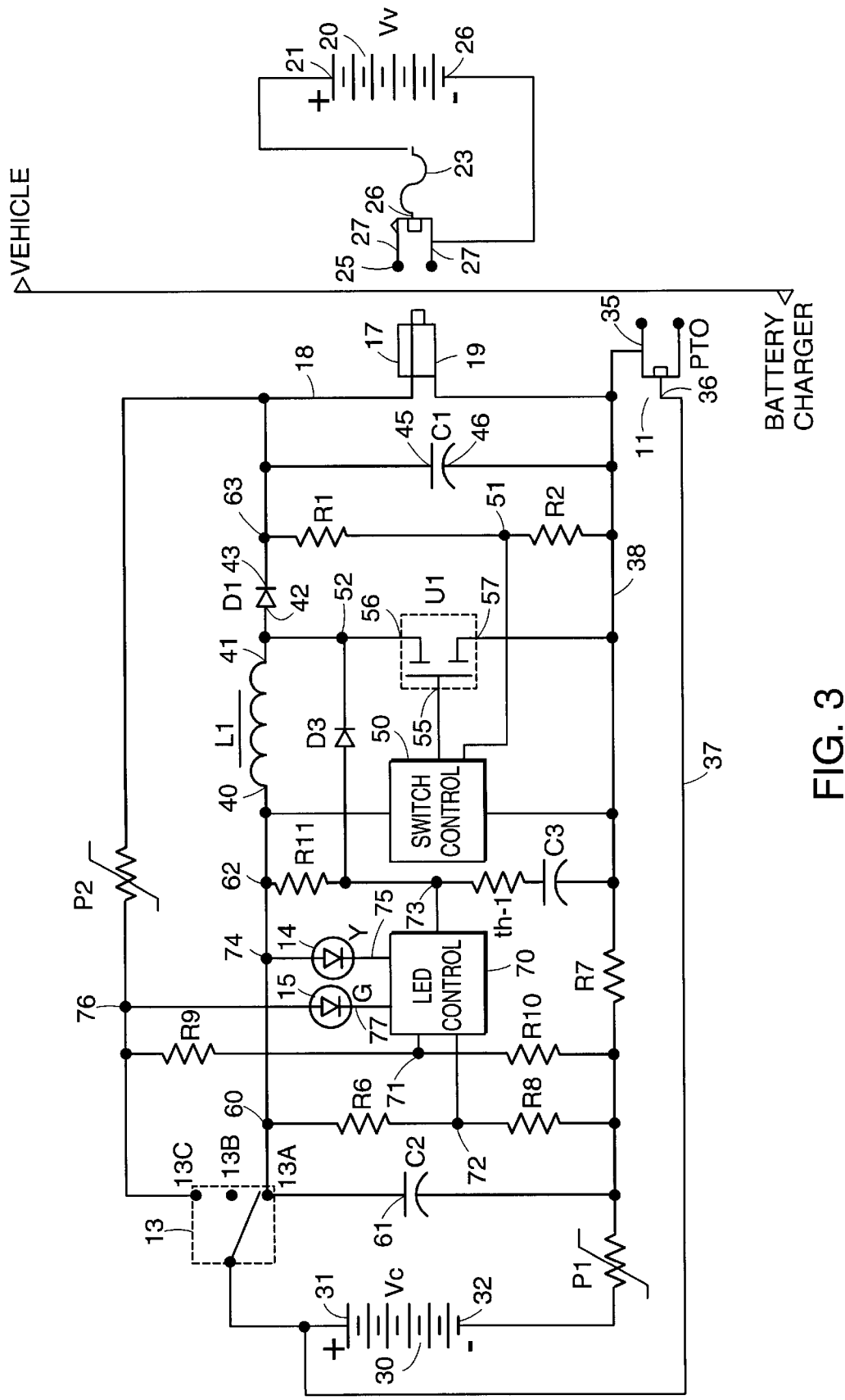
FIG. 3 illustrates the diagram of FIG. 2 modified according to the present invention.
Figure 4:
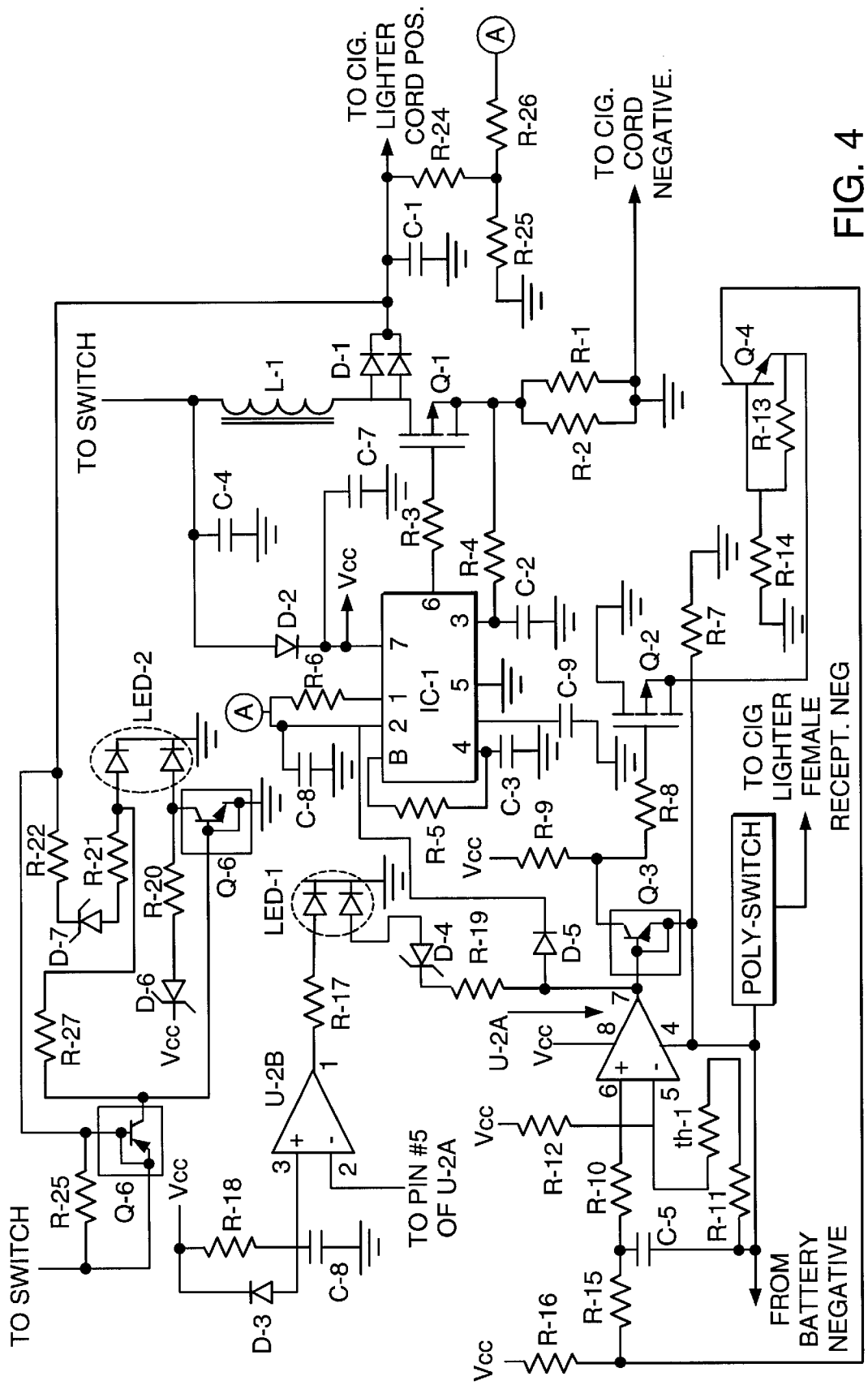
FIG. 4 is a schematic circuit diagram according to the present invention.

Referring to FIGS. 3 and 4, the present embodiment of the invention, provides a 2 ohm, 10 watt, block resistor R-7 in parallel with a power MOSFET on the negative side of the unit. The block resistor has a resistance in the range of 1 to 4 ohms, and a watt rating of from 8 to 12 watts. When the unit is turned on, the preconditioning step prevents excessive current levels when the voltage differential between the vehicle battery and the charging battery is high. This step provides preconditioning to the depleted battery. The resistor limits the charging current to 7 amps. The preconditioning charge of 7 amps is maintained until the discharged battery voltage reaches 10.5 volts or when the voltage differential across the resistor is less than 2 volts. This generally takes from 30 to 35 seconds. When this point is reached, an operational amplifier is activated turning on the FET that completes the negative path. In this embodiment of the invention this is the most efficient charge point. At this point of activation a DC-to-DC "up" converter is engaged to boost the DC level of the charging battery to 15–17 amps. The invention will run in the fully charging mode from 10 to 15 minutes. The invention uses a current mode PMW controller device that provides cycle-by-cycle current limitation that prevents over-current conditions from occurring. A timer is also incorporated into the invention that activates the second green light at a predetermined time.

The original circuitry in the '978 patent (see FIG. 2) had a simple resistor/capacitor circuit that took a resistor of fixed value and a charge capacitor of fixed value giving a fixed time regardless of temperature. For temperature control, a thermistor th-1 is placed in series with the resistor R-11 to vary the time it takes to charge the capacitor depending on the unit's temperature. In this embodiment of the invention the thermistor is a negative type where a decrease in temperature results in an increase in resistance resulting in longer time to charge the capacitor. The temperature of both the discharged battery and the second battery is dependent upon the ambient temperature and time of either battery to reach that temperature if, before use, either is at a temperature different than the ambient temperature. For example is the situation where the second battery is brought to a cold garage holding the vehicle with the discharged battery.

It is understood that the above-described embodiment is merely illustrative of the application. Other embodiments may be readily devised by those skilled in the art which will embody the principles of the invention and fall within the spirit and scope thereof.

We claim:

1. A self-contained emergency battery booster for charging, through a vehicle's cigarette lighter receptacle, a fully or partially discharged vehicle storage battery which delivers current to a starter motor of the vehicle, comprising:

a housing having a rectangular shape with a front, back, two sides, a top and a bottom, said housing having an auxiliary power tap adapted to draw power from a charging battery for non-vehicle battery charging purposes, said housing having an opening through which a power cord passes, said auxiliary power tap forming an auxiliary circuit formed with the charging battery, said tap being comprised of a female receptacle terminating centrally along its central longitudinal axis in a positive lead, said positive lead being electrically connected by means of an electrical line to a charging battery positive terminal, said receptacle being electrically connected to a common ground connected to a charging battery negative terminal, said auxiliary power tap auxiliary circuit having a positive temperature coefficient resistor between the charging battery negative terminal and the common ground;

said charging battery within said housing providing a charging battery output, said charging battery having a nominal terminal voltage equal to or less than the nominal voltage of the vehicle's storage battery, said charging battery having said positive terminal and said negative terminal;

first switching means within said housing connected to said charging battery positive terminal, said first switching means being comprised of a three-way switch adapted to electrically connect the charging battery positive terminal to one of three nodes, a charge node, an OFF node, and a recharge circuit, said connection to said charge node establishing a circuit whereby the charging battery and a boost converter circuit charge the vehicle storage battery through said cigarette lighter receptacle, said connection to said recharge node establishing a circuit whereby the charging battery is recharged from said vehicle storage battery through said cigarette lighter receptacle, and said connection to said OFF node electrically opens said charging battery positive terminal;

said boost converter circuit within said housing connected to said first switching means and adapted to derive energy from said charging battery wherein said boost converter circuit provides an additional 2 to 3 volts output to said charging battery output;

means for connecting said charging battery output and said booster circuit output to said vehicle storage battery, said means comprising said power cord terminating in a male receptacle adapted for insertion into said vehicle's cigarette lighter receptacle, said male receptacle having a cylindrical housing electrically connected to said charging negative terminal thereby forming said common ground and a positive lead formed centrally along a central longitudinal axis and connected to said boost converted circuit;

indicator means mounted on said housing adapted to indicate the charging status of the charging battery and the vehicle storage battery;

wherein said charge node circuit is comprised of:
      a second capacitor electrically in parallel to the charging battery wherein a positive terminal of said second capacitor is electrically connected to said switch charge node and a negative terminal of said second capacitor is connected to said common ground;
      a first resistance network comprised of two resistors in series electrically connected in parallel with said second capacitor;
      a resistance-capacitance network comprised of a resistor and third capacitor in series, said resistance-capacitance network being electrically connected in parallel with said first resistance network;

said booster converter circuit comprised of:
      an inductance having an input terminal and an output terminal, said input terminal being electrically connected to the second capacitor positive terminal, a first resistance network positive node, and a resistance-capacitance positive node;
      a first diode having a positive terminal and a negative terminal, said positive terminal being connected in series with said inductance negative terminal, said first diode negative terminal being connected to the positive lead of the power cord male receptacle; and
      a second switch having a primary terminal and two secondary terminals, one of said secondary terminals being positive and the other being negative, said secondary terminals being adapted to jointly connect to said primary terminal or being jointly disconnected from said primary terminal, said positive secondary terminal being connected to said inductance output terminal and said negative secondary terminal being connected to said common ground; and
      a second switch control means adapted to operate said second switch;

a second resistance network comprised of two resistors in series, said second resistance network interconnecting said first diode negative terminal to said common ground; and a first capacitor, having a positive terminal and a negative terminal, connected in parallel to the second resistance network wherein said first capacitor positive terminal is electrically connected to a second resistance network positive node, and said first capacitor negative terminal is attached to common ground;

wherein said first diode negative terminal, said second resistance network positive node, and said first capacitor positive terminal are electrically connected to the positive lead of the power cord male receptacle;

wherein said power cord male receptacle is inserted into said cigarette lighter receptacle thereby establishing an electrical connection among the first capacitor positive terminal, the first diode negative terminal and a second resistance network positive node, and the vehicle battery positive terminal, and thereby establishing an electrical connection between the vehicle battery negative terminal and said common ground;

a preconditioning circuit comprised of a block resistor in parallel with a power MOSFET connected between a charging battery negative terminal circuit and the common ground.

2. A battery booster as recited in claim 1, further comprising:

a temperature circuit comprised of a thermistor placed in series with the resistance-capacitance network resistor.

3. A battery booster as recited in claim 2, wherein:

said block resistor has a resistance in the range of 1 to 4 ohms, and a watt rating of from 8 to 12 watts.

4. A battery booster as recited in claim 3, wherein:

said thermistor is adapted to increase in resistance when ambient temperature decreases.

* * * * *